(12) United States Patent
Kiefer et al.

(10) Patent No.: US 12,017,423 B2
(45) Date of Patent: Jun. 25, 2024

(54) CUSTOMIZED COMPOSITE DEBULKING CAUL

(71) Applicant: Honeywell Federal Manufacturing & Technologies, LLC, Kansas City, MO (US)

(72) Inventors: Seth M. Kiefer, Kansas City, MO (US); Phillip C. Davis, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 17/941,590

(22) Filed: Sep. 9, 2022

(65) Prior Publication Data

US 2023/0085289 A1 Mar. 16, 2023

Related U.S. Application Data

(62) Division of application No. 16/930,438, filed on Jul. 16, 2020, now abandoned.

(51) Int. Cl.
| | |
|---|---|
| *B29C 70/54* | (2006.01) |
| *B29C 33/38* | (2006.01) |
| *B29C 70/34* | (2006.01) |
| *B33Y 80/00* | (2015.01) |

(52) U.S. Cl.
CPC ........ *B29C 70/544* (2021.05); *B29C 33/3842* (2013.01); *B29C 70/342* (2013.01); *B33Y 80/00* (2014.12); *B29K 2819/00* (2013.01)

(58) Field of Classification Search
None
See application file for complete search history.

(56) References Cited

U.S. PATENT DOCUMENTS

| | | |
|---|---|---|
| 8,420,002 B2 | 4/2013 | Sekido et al. |
| 8,668,858 B2 | 3/2014 | Ashton et al. |
| 9,108,395 B2 | 8/2015 | Whitworth et al. |
| 9,682,514 B2 | 6/2017 | Lockett et al. |
| 9,931,795 B2 | 4/2018 | Lutz |
| 10,434,690 B2 | 10/2019 | Rydin et al. |

(Continued)

FOREIGN PATENT DOCUMENTS

| | | |
|---|---|---|
| EP | 0491651 | 8/1995 |

OTHER PUBLICATIONS

Reusable vacuum membranes: Coming of Age ?; Dated Nov. 13, 2013; webpage: https://www.compositesworld.com/articles/reusable-vacuum-membranes-coming-of-age.

(Continued)

*Primary Examiner* — Christopher T Schatz
(74) *Attorney, Agent, or Firm* — Hovey Williams LLP

(57) ABSTRACT

A caul for debulking a composite part broadly includes opposing first and second surfaces, a plurality of through-holes, and a coating. The first surface may have a curvature complementary to a shape of the composite part. The through-holes pass through the caul from the first surface to the second surface. The coating may be a chemically inert material to ensure the caul does not affect the composite part. The caul is configured to be positioned against the composite part for debulking. The caul may be made out of silicone rubber or any other suitable material and may be reusable.

10 Claims, 4 Drawing Sheets

(56) References Cited

U.S. PATENT DOCUMENTS

| | | | | |
|---|---|---|---|---|
| 2006/0249868 A1* | 11/2006 | Brown | ................... | B32B 38/04 |
| | | | | 156/196 |
| 2008/0060755 A1* | 3/2008 | Blanton | ............... | B29C 70/465 |
| | | | | 264/258 |
| 2013/0264751 A1* | 10/2013 | Lockett | ................ | B29C 70/021 |
| | | | | 264/571 |

OTHER PUBLICATIONS

Manufacturing of Polymer Composites FS 17; Exercise 6: Solution; Out-of-Autoclave Processing; pp. 1-8.

* cited by examiner

CUSTOMIZED COMPOSITE DEBULKING CAUL

RELATED APPLICATIONS

The present application is a divisional patent application claiming priority benefit, with regard to all common subject matter, to U.S. patent application Ser. No. 16/930,438, entitled "CUSTOMIZED COMPOSITE DEBULKING CAUL", filed Jul. 16, 2020. The earlier-filed patent application is hereby incorporated by reference in its entirety into the present application.

STATEMENT REGARDING FEDERALLY-SPONSORED RESEARCH OR DEVELOPMENT

This invention was made with Government support under Contract No. DE-NA-0002839 awarded by the United States Department of Energy/National Nuclear Security Administration. The Government has certain rights in the invention.

BACKGROUND

Composite part debulking requires laying up release film directly onto a surface of a composite part, enclosing the composite part and the release film in a vacuum bag, and removing air from the vacuum bag to draw trapped air out of the composite part. Laying up the release film is time consuming and requires expertise and attention to detail. A poor layup often causes wrinkles to form on the surface of the composite part. Mislaid and used release film must be discarded and new release film must be used for subsequent layups.

SUMMARY

Embodiments of the invention solve the above-mentioned problems and other problems and provide a distinct advancement in the art of composite part debulking. More particularly, the invention provides a reusable composite part debulking caul that eliminates the need for laying up release film directly onto a surface of the composite part.

An embodiment of the invention is a composite part debulking caul broadly comprising opposing first and second surfaces, a number of through-holes, and a coating. The caul may be made of silicone rubber or any other moldable, shapeable material. Alternatively, the caul may be made of machined or additively manufactured material.

The first surface may have a curvature complementary to a shape of a composite part being debulked. The curvature may follow a simple shape (e.g., a constant radius arc, a parabola, a hyperbola, or the like) or complex shapes such as splines, airfoils, or combinations of simple shapes. The curvature may also be defined in a single plane or may be complex such as saddle geometry.

The second surface is opposite the first surface. Unlike the first surface, the second surface does not need to have a particular geometry. For example, the second surface may be rectangular or a simplified approximation of the curvature of the first surface. Nonetheless, the second surface may at least partially follow the curvature of the first surface such that the caul has a substantially uniform thickness.

The through-holes pass through the caul from the first surface to the second surface. The through-holes may be punctures, perforations, spaces between webbing, material voids, and the like. The through-holes may be evenly spaced from each other to allow air to be drawn evenly from the composite part.

The coating covers at least one of the first surface and second surface. The coating may be a chemically inert material to ensure the caul does not affect the composite part or any other objects with which the caul may come into contact. The coating may also protect the first surface and/or the second surface from damage.

In use, the caul may be shaped to be complementary to a shape of the composite part. To that end, material may be removed from the caul via subtractive manufacturing (e.g., milling, cutting, carving, or the like), added to the caul via additive manufacturing (e.g., 3D printing, sintering, melting, or the like) or shaped via molding (e.g., high pressure molding, injection molding, or the like).

The through-holes may be formed in the caul. For example, the caul may be punctured or perforated via a hole-forming tool. Alternatively, the through-holes may be formed as the caul is shaped.

The coating may then be applied to the first and second surfaces of the caul. For example, the caul may be dipped in a coating material, or the coating material may be sprayed onto the caul.

The composite part may then be placed on a tool. At this stage, the composite part may be laid up layer by layer on the tool or may be transferred from a layup tool.

The caul may then be positioned on the composite part such that the first surface contacts the contoured surface of the composite part. The caul may be pressed against the composite part to eliminate gaps between the caul and the composite part except for the airways formed by the through-holes.

A porous sheet may then be positioned on the caul opposite the composite part such that the porous sheet contacts the second surface of the caul. The porous sheet may be pressed against the caul to eliminate gaps between the porous sheet and the composite part except for airways formed by the through-holes and pores in the porous sheet.

The caul, porous sheet, and the composite part may then be enclosed in a vacuum bag. This may include sealing the vacuum bag except for an outlet for removing air from a chamber formed by the vacuum bag.

Air may be then be removed from the chamber of the vacuum bag via a vacuum pump connected to the outlet. The vacuum created by the vacuum pump draws air from the composite part through the through-holes of the caul and the pores of the porous sheet. In this way, air trapped between layers of the composite part is removed from the composite part, resulting in a more consistent and structurally sound composite lamination.

The above-described caul provides several advantages. For example, the caul mistake-proofs debulking, thereby reducing or eliminating wrinkles in the composite part resulting from poor or inaccurate conventional bagging techniques. The caul reduces the expertise and amount of attention to detail required for debulking. The caul significantly reduces preparation time and is reusable, thereby eliminating the need to apply release fabric to identical composite part mock-ups in preparation for debulking. The caul may have well-distributed through-holes, ensuring even debulking. The chemically inert coating prevents the caul from chemically affecting the composite part.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
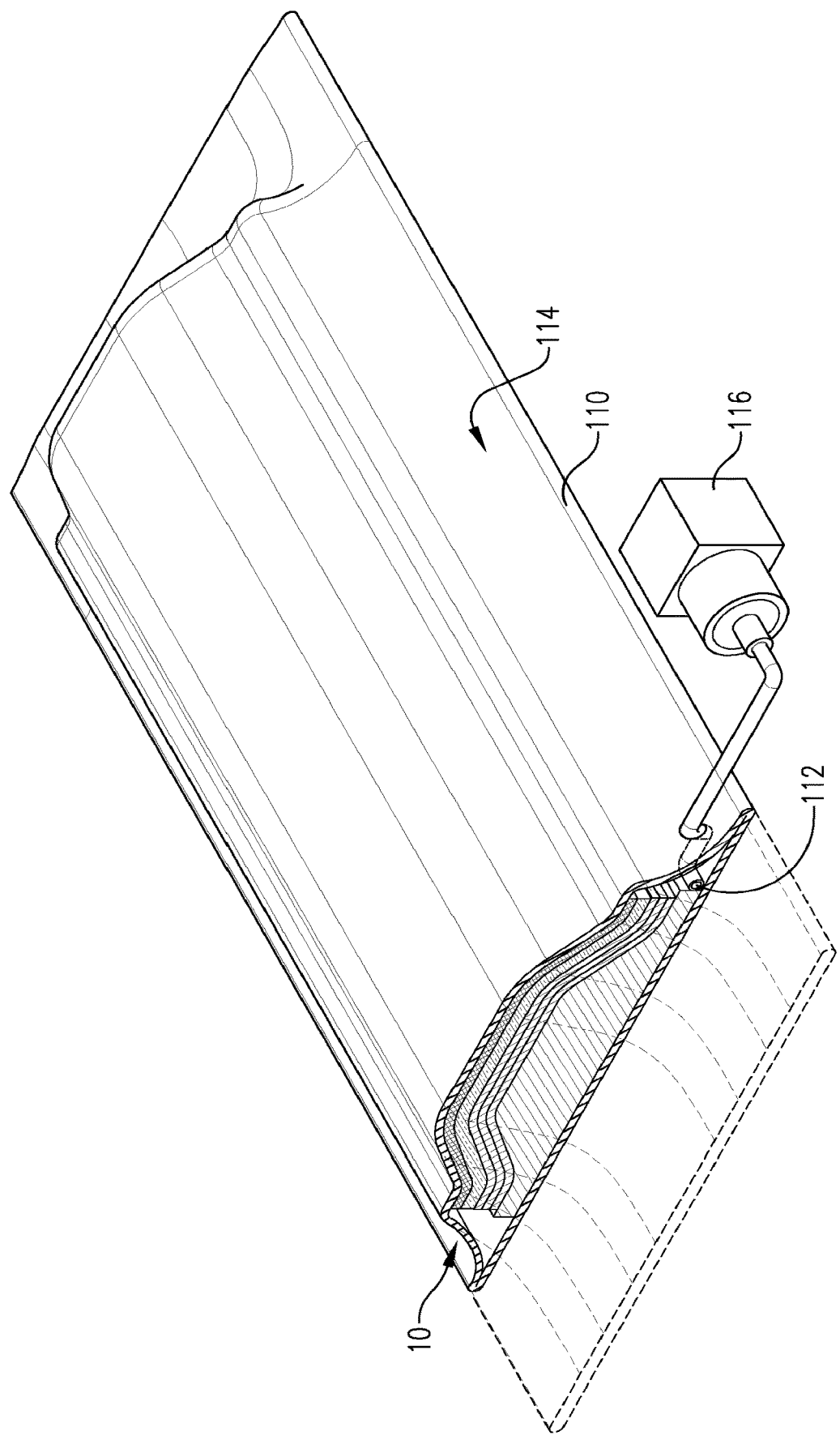
FIG. 1 is a perspective view of a customized debulking caul constructed in accordance with an embodiment of the invention and shown as part of a debulking setup.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
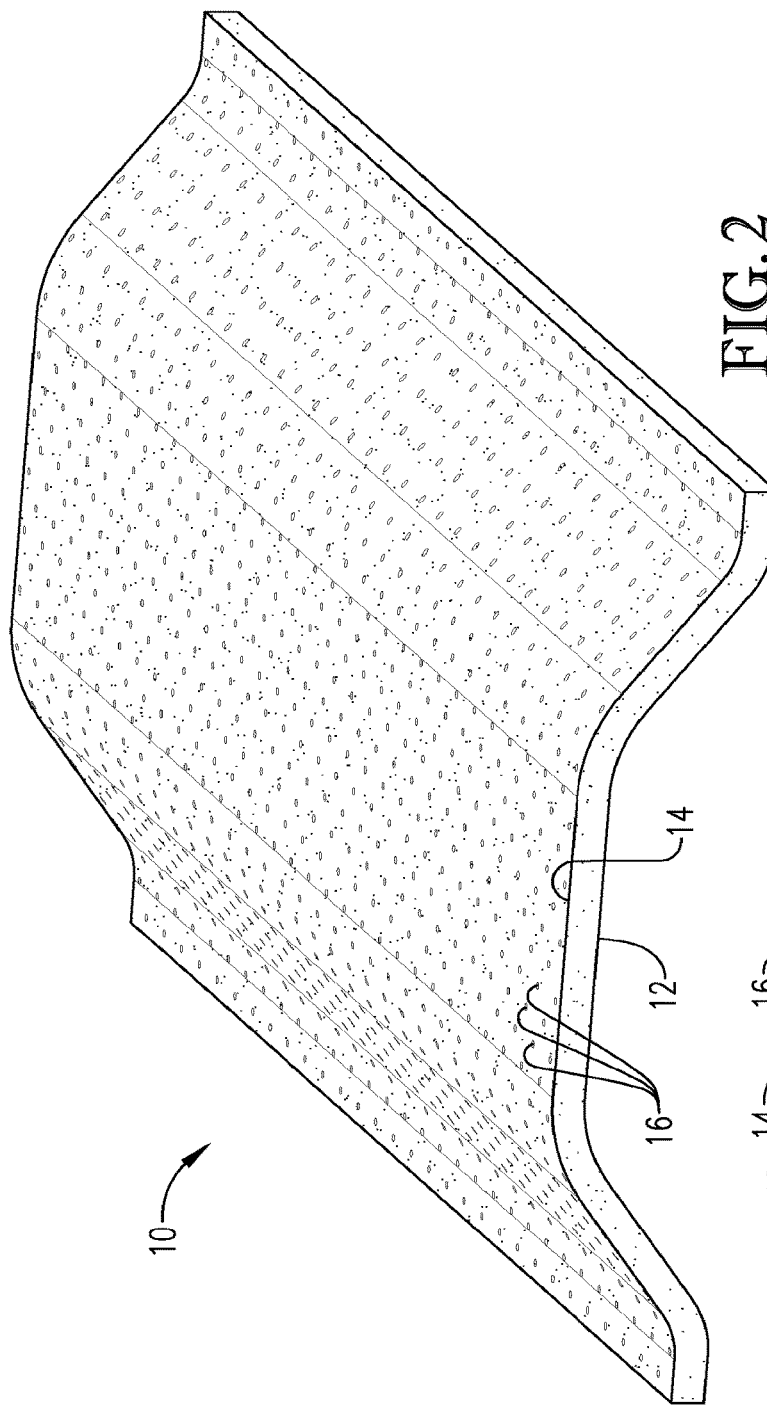
FIG. 2 is a perspective view of the caul of FIG. 1.

Turning to FIGS. 1 and 2, a caul 10 for debulking a composite part in accordance with an embodiment of the invention is illustrated. The caul 10 broadly comprises opposing first and second surfaces 12, 14, a plurality of through-holes 16, and a coating. The caul 10 is shown pressed against a composite part 100 for debulking. The caul 10 may be made out of silicone rubber or any other suitable material and may be reusable. In one embodiment, the caul 10 may be raw silicone rubber EL-80 produced by Torr Technologies.

The first surface 12 may have a curvature complementary to a shape of the composite part 100. The curvature may follow a simple shape (e.g., a constant radius arc, a parabola, a hyperbola, or the like) or complex shapes such as splines, airfoils, or combinations of simple shapes. The curvature may also be defined in a single plane or may be complex such as saddle geometry.

The second surface 14 is opposite the first surface 12. Unlike the first surface 12, the second surface 14 does not need to have a particular geometry. For example, the second surface 14 may be rectangular or a simplified approximation of the curvature of the first surface 12. Nonetheless, the second surface 14 may at least partially follow the curvature of the first surface 12 such that the caul 10 has a substantially uniform thickness.

The through-holes 16 pass through the caul 10 from the first surface 12 to the second surface 14. The through-holes 16 may be punctures, perforations, spaces between webbing, material voids, and the like. The through-holes 16 may be evenly spaced from each other to allow air to be drawn evenly from the composite part 100.

The coating covers at least one of the first surface 12 and second surface 14. The coating may be a chemically inert material to ensure the caul 10 does not affect the composite part 100 or any other objects with which the caul 10 may come into contact. The coating may be Slick Sil produced by Surface Solutions Group. The coating may also protect the first surface 12 and/or the second surface from damage. That is, the coating, if damage, may be repaired more easily than the caul 10.

Figure 3:
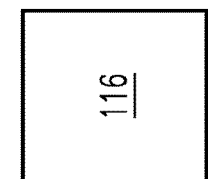
FIG. 3 is a cutaway elevation view of the caul and debulking setup of FIG. 1.

Turning to FIG. 3, and with reference to FIGS. 1 and 2, a method of making the caul 10 and debulking the composite part 100 will now be described in detail. First, the first surface 12 of the caul 10 may be shaped to be complementary to a shape of the composite part 100, as shown in block 200. To that end, material may be removed from the caul 10 via subtractive manufacturing (e.g., milling, cutting, carving, or the like), added to the caul via additive manufacturing (e.g., 3D printing, sintering, melting, or the like) or shaped via molding (e.g., high pressure molding, injection molding, or the like).

The through-holes 16 may be formed in the caul 10, as shown in block 202. For example, the caul 10 may be punctured or perforated via a hole-forming tool. Alternatively, the through-holes 16 may be formed as the caul 10 is shaped. In the case of additive manufacturing, material may be deposited in a pattern leaving material voids. In the case of molding, the through-holes 16 may be formed as a natural consequence of manipulating the material. For example, the material could be heated and/or pressurized to form the through-holes 16. A supplementary material could also be added or mixed with the material such that manipulation or removal of the supplementary material forms the through-holes 16.

The coating may then be applied to the first and second surfaces 12, 14 of the caul 10, as shown in block 204. For example, the caul 10 may be dipped in a coating material, or the coating material may be sprayed onto the caul 10.

The composite part 100 may then be placed on a tool 102 with a contoured surface 104 being exposed opposite the tool 102, as shown in block 206. At this stage, the composite part 100 may be laid up layer by layer on the tool 102 or may be transferred from a layup tool.

The caul 10 may then be positioned on the composite part 100 such that the first surface 12 contacts the contoured surface 104 of the composite part 100, as shown in block 208. The caul 10 may be pressed against the composite part to eliminate gaps between the caul 10 and the composite part 100 except for the airways formed by the through-holes 16.

A porous sheet 206 may then be positioned on the caul 10 opposite the composite part 100 such that the porous sheet 106 contacts the second surface 14 of the caul 10, as shown in block 210. The porous sheet 106 may be pressed against the caul 10 to eliminate gaps between the porous sheet 106 and the composite part 100 except for airways formed by the through-holes 16 and pores 108 in the porous sheet 106.

Figure 4:
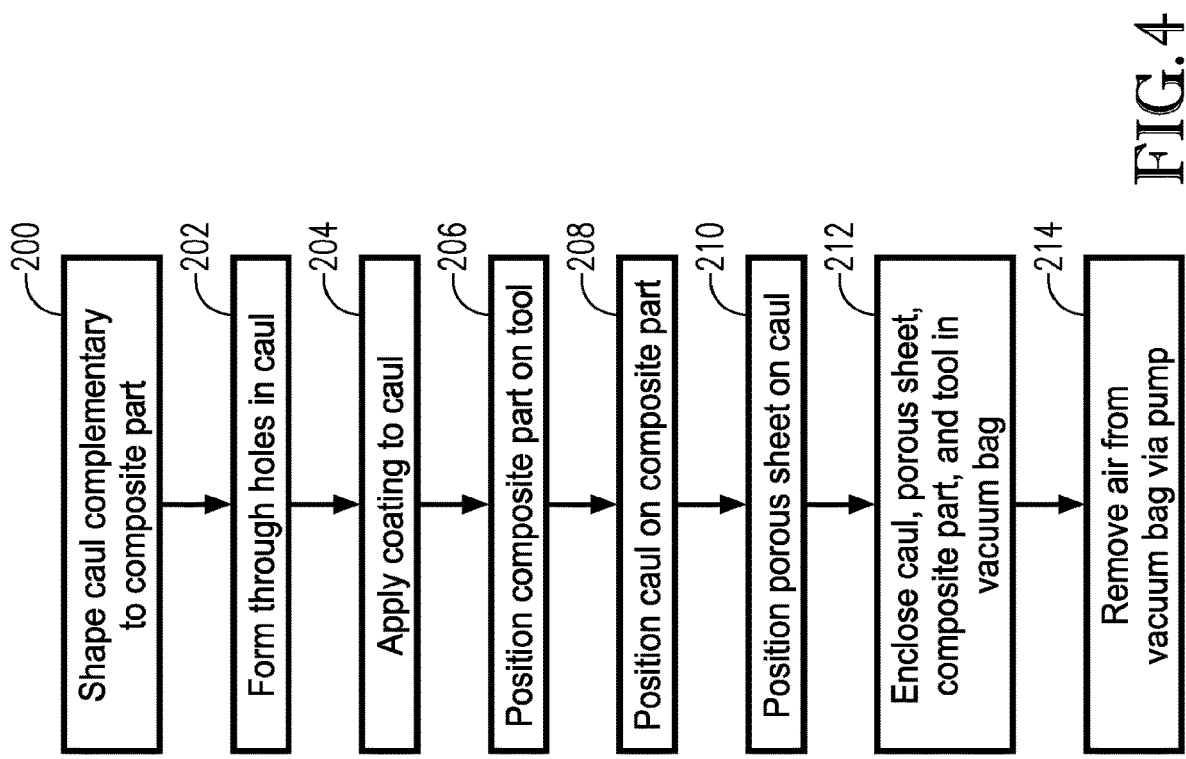
FIG. 4 is a flow diagram showing certain method steps for debulking a composite part.

The caul 10, porous sheet 106, and the composite part 100 may then be enclosed in a vacuum bag 110, as shown in FIG. 3 and block 212 of FIG. 4. This may include sealing the vacuum bag 110 except for an outlet 112 for removing air from a chamber 114 formed by the vacuum bag 110.

Figure 5:
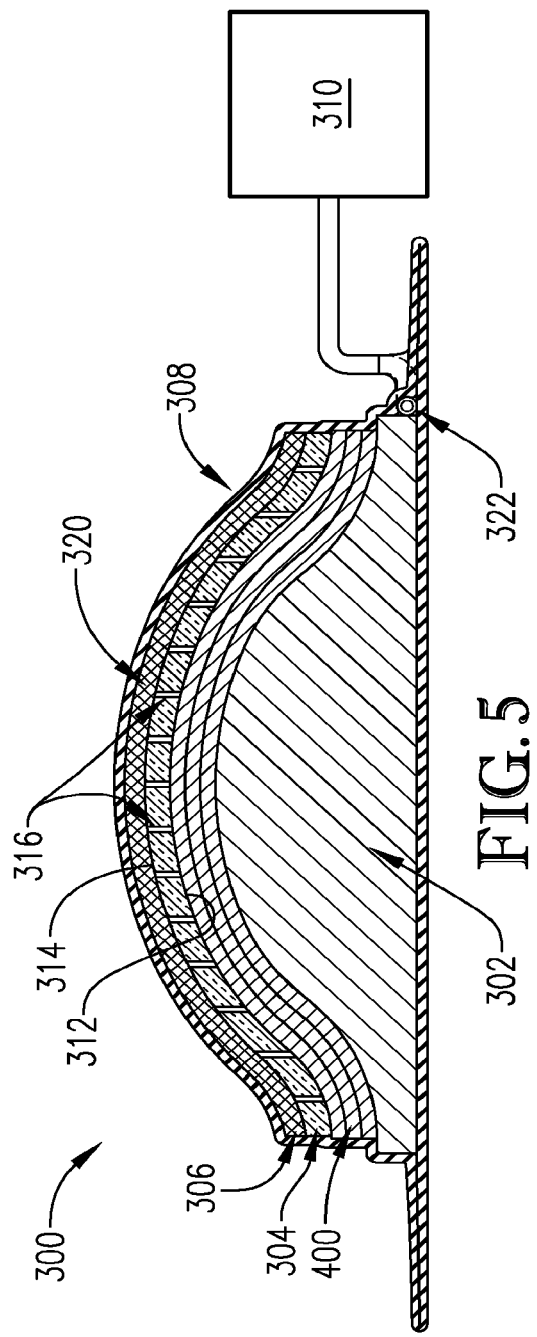
FIG. 5 is a cutaway elevation view of a composite part debulking system constructed in accordance with another embodiment of the invention.

Air may be then be removed from the chamber 112 of the vacuum bag 110 via a vacuum pump 116 connected to the outlet 112, as shown in block 214 (see also FIG. 5 for a vacuum-induced vacuum bag). The vacuum created by the vacuum pump 116 draws air from the composite part 100 through the through-holes 16 of the caul 10 and the pores 108 of the porous sheet 106. In this way, air trapped in the composite part 100 is debulked, resulting in a more consistent and structurally sound composite lamination.

The above-described caul 10 provides several advantages. For example, the caul 10 mistake-proofs debulking, thereby reducing or eliminating wrinkles in the composite part 100 resulting from poor or inaccurate conventional bagging techniques. The caul 10 reduces the expertise and amount of attention to detail required for debulking. The caul 10 significantly reduces preparation time and is reusable, thereby eliminating the need to apply release fabric to identical composite part mock-ups in preparation for debulking. The caul 10 may have well-distributed through-holes 16, ensuring even debulking. The chemically inert coating prevents the caul 10 from chemically affecting the composite part 100.

Turning to FIG. 5, a system 300 for debulking a composite part in accordance with another embodiment of the invention is illustrated. The system 300 broadly comprises a tool 302, a caul 304, a porous sheet 306, a vacuum bag 308, and a vacuum pump 310.

The tool 302 may be a base structure on which the composite part is placed. The tool 302 may be contoured to be complementary to an underside shape of the resulting composite part. The tool 302 may be a mandrel, jig, mold, or the like.

The caul 304 broadly comprises opposing first and second surfaces 312, 314, a plurality of through-holes 316, and a coating. The caul 304 is shown pressed against composite part 400 in a debulking procedure. The caul 304 may be made out of silicone rubber or any other suitable material. In one embodiment, the caul 304 may be raw silicone rubber EL-80 produced by Torr Technologies.

The first surface 312 may have a curvature complementary to a shape of the composite part 400. The curvature may follow a simple shape (e.g., a constant radius arc, a parabola, a hyperbola, or the like) or complex shapes such as splines, airfoils, or combinations of simple shapes. The curvature may also be defined in a single plane or may be complex such as saddle geometry.

The second surface 314 is opposite the first surface 312. Unlike the first surface 312, the second surface 314 does not need to have a particular geometry. For example, the second surface 314 may be rectangular or a simplified approximation of the curvature of the first surface 312. Nonetheless, the second surface 314 may at least partially follow the curvature of the first surface 312 such that the caul 304 has a substantially uniform thickness.

The through-holes 316 pass through the caul 304 from the first surface 312 to the second surface 314. The through-holes 316 may be punctures, perforations, spaces between webbing, material voids, and the like. The through-holes 316 may be evenly spaced from each other to allow air to be drawn evenly from the composite part 400.

The coating covers at least one of the first surface 312 and second surface 314. The coating may be a chemically inert material to ensure the caul 304 does not affect the composite part 400 or any other objects with which the caul 304 may come into contact. The coating may be Slick Sil produced by Surface Solutions Group. The coating may also protect the first surface 312 and/or the second surface from damage. That is, the coating, if damage, may be repaired more easily than the caul 304.

The porous sheet 306 includes a plurality of pores 320 and may be woven fabric, polytetrafluoroethylene (i.e., Teflon™), nylon, or other porous release fabric material (e.g., Peel Ply produced by Airtech International). The porous sheet 306 may be configured to be positioned on the second surface 314 of the caul 304.

The vacuum bag 308 may be an airtight flexible enclosure including an opening 322. The vacuum bag 308 may be configured to enclose and form a vacuum around the tool 302, the caul 304, and the porous sheet 306.

The vacuum pump 310 may be connected to the vacuum bag 308 via the opening 322. The vacuum pump 310 may be configured to draw air from within the vacuum bag 308. In one embodiment, the vacuum pump 310 may be configured to draw air until a specific vacuum pressure is reached.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of debulking a laminated composite part, the method comprising steps of: placing the laminated composite part on a debulking tool, the laminated composite part including layers of composite material with air trapped between the layers of composite material; positioning a debulking caul on the laminated composite part opposite the debulking tool so that a first surface of the debulking caul contacts a contoured surface of the laminated composite part; positioning a porous sheet on the debulking caul opposite the laminated composite part such that the porous sheet contacts a second surface of the debulking caul opposite the first surface of the debulking caul; enclosing the debulking caul, the porous sheet, and the laminated composite part in a chamber of a vacuum bag; and removing air from the chamber of the vacuum bag thereby drawing the air trapped between the layers of the laminated composite part through through-holes of the debulking caul and pores of the porous sheet.

2. The method of claim 1, further comprising a step of pressing the debulking caul against the laminated composite part to eliminate gaps between the debulking caul and the composite part.

3. The method of claim 1, further comprising a step of pressing the porous sheet against debulking caul to eliminate gaps between the porous sheet and the laminated composite part.

4. The method of claim 1, the step of placing the laminated composite part on the debulking tool including transferring the laminated composite part from a layup tool.

5. The method of claim 1, wherein the debulking caul has a contour complementary to a shape of the laminated composite part.

6. The method of claim 1, wherein the debulking tool has a contour complementary to an underside shape of the laminated composite part.

7. The method of claim 1, wherein the debulking caul includes a chemically inert coating covering at least one of the first surface and the second surface of the debulking caul.

8. The method of claim 1, wherein the through-holes of the debulking caul are evenly spaced from each other.

9. The method of claim 1, wherein the through-holes of the debulking caul are at least one of punctures, perforations, webbing spaces, and material voids.

10. A method of debulking a laminated composite part, the method comprising steps of:
  laying up layers of composite material on a debulking tool to form a lamination with air trapped between the layers of composite material such that the layers of composite material form the laminated composite part on the debulking tool, the debulking tool having a contour complementary to an underside shape of the laminated composite part;
  positioning a debulking caul on the laminated composite part opposite the debulking tool so that a first surface of the debulking caul contacts a contoured surface of the laminated composite part, the debulking caul having contour complementary to a shape of the contoured surface of the laminated composite part and including a chemically inert coating covering the first surface of the debulking caul;
  pressing the debulking caul against the laminated composite part to eliminate gaps between the debulking caul and the laminated composite part;
  positioning a porous sheet on the debulking caul opposite the laminated composite part such that the porous sheet contacts a second surface of the debulking caul opposite the first surface of the debulking caul;
  pressing the porous sheet against the debulking caul to eliminate gaps between the porous sheet and the composite part;
  enclosing the debulking caul, the porous sheet, and the laminated composite part in a chamber of a vacuum bag;
  sealing the vacuum bag except for an outlet for removing air from the chamber of the vacuum bag; and
  removing air from the chamber of the vacuum bag via the outlet thereby drawing the air trapped between the layers of the laminated composite part through through-holes of the debulking caul and pores of the porous sheet.

\* \* \* \* \*